Sept. 1, 1964  J. B. SWETT  3,146,906
CARRIER TRAY

Filed Feb. 8, 1962  3 Sheets-Sheet 1

INVENTOR.
JAMES B. SWETT
BY Harold R. Beck
ATTORNEY

Sept. 1, 1964  J. B. SWETT  3,146,906
CARRIER TRAY

Filed Feb. 8, 1962  3 Sheets-Sheet 2

INVENTOR.
JAMES B. SWETT
BY Harold R. Beck

ATTORNEY

Sept. 1, 1964  J. B. SWETT  3,146,906
CARRIER TRAY

Filed Feb. 8, 1962  3 Sheets-Sheet 3

INVENTOR.
JAMES B. SWETT
BY *Harold P. Beck*
ATTORNEY

United States Patent Office 3,146,906
Patented Sept. 1, 1964

3,146,906
CARRIER TRAY
James B. Swett, Barrington, R.I., assignor to Rexall Drug and Chemical Company, Los Angeles, Calif., a corporation of Delaware
Filed Feb. 8, 1962, Ser. No. 172,006
3 Claims. (Cl. 220—103)

The present invention is directed to a beverage tray and server primarily for use in transporting beverage tumblers and hors d'oeuvres. The tray permits a person to carry six beverage tumblers and hors d'oeuvres in one hand thereby leaving the other hand free to open doors or carry other objects. When fully loaded the tray has excellent pendulous stability which prevents spilling of the liquid in the tumblers. Cups are provided in the base of the tray into which the tumblers are inserted to prevent sliding of the tumblers on the tray.

My invention is further directed to a detachable server dish which may be used for serving hors d'oeuvres if desired, however the beverage tray may be used with or without the server dish.

My invention is further directed to a cake server provided by merely removing the handle from the tray and inverting the entire carrier tray whereby the server dish functions as a base and the bottom surface of the beverage tray functions as a cake support for the cake server.

In the drawings I have shown a present preferred embodiment of my invention in which.

Briefly the present invention includes a lower tray having upstanding peripheral rim and a plurality of integral radially spaced cups, and an integral central post extending upwardly from the tray and supporting an upper serving tray. Preferably a handle is releasably engaged with the post and maintains the upper tray in its desired position.

Figure 1:
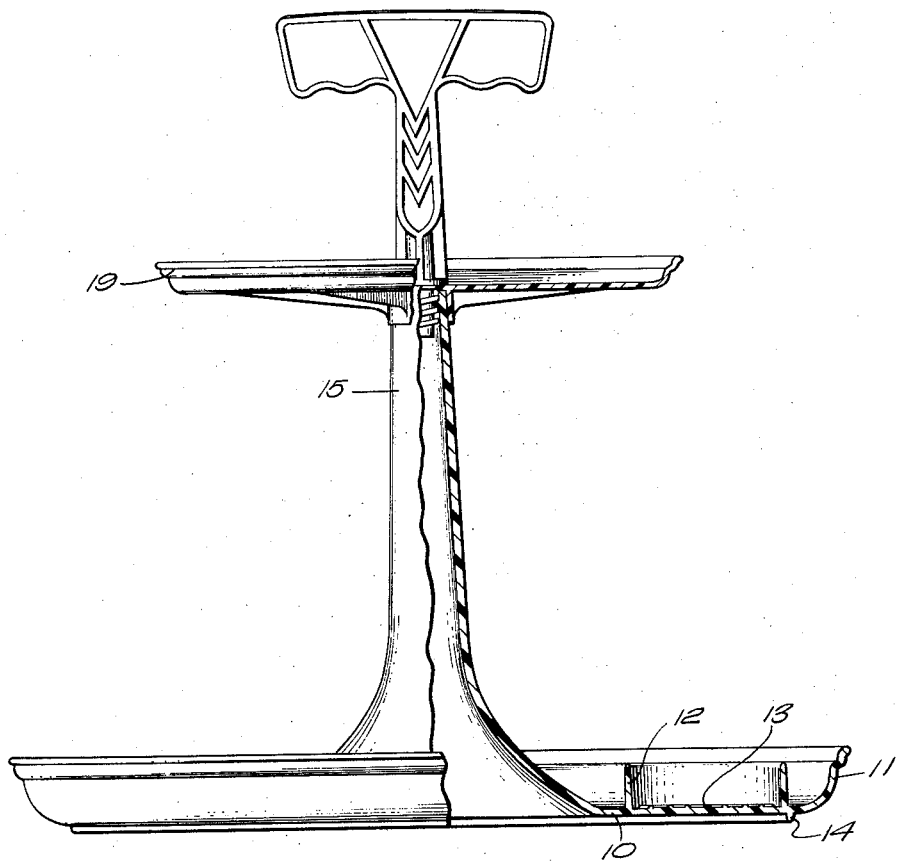
FIGURE 1 is a side elevation view of my invention with parts removed for clarity.
Figure 2:
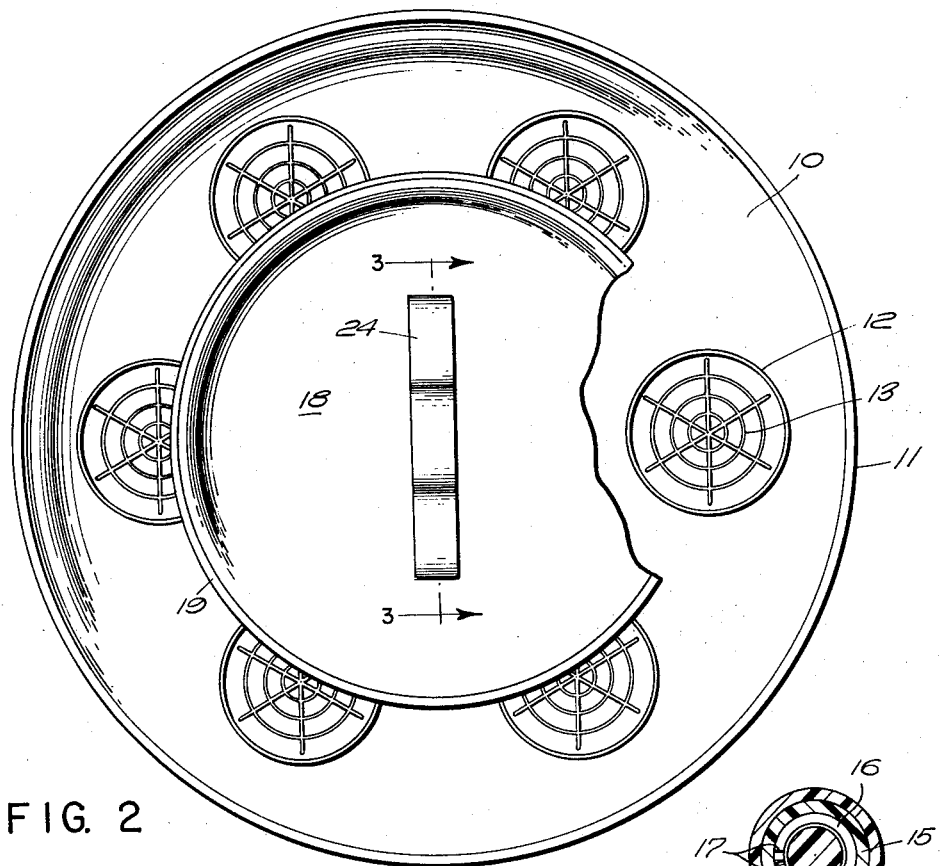
FIGURE 2 is a plan view of my invention with parts removed for clarity.
Figure 5:
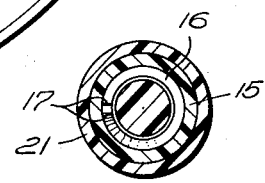
FIGURE 5 is a cross-section taken on line 5—5 of FIGURE 3 with parts removed for clarity.
Figure 3:
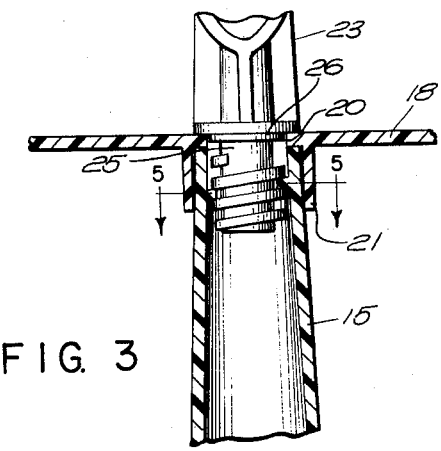
FIGURE 3 is a cross-section taken on line 3—3 of FIGURE 2.

Referring specifically to the drawings, the lower tray includes a substantially flat bottom wall 10 having an upstanding peripheral rim 11. A plurality of short cylindrical cups 12 are integral with the flat portion of the tray 10 and are sufficiently large in diameter to receive a conventional glass tumbler. A plurality of raised ribs 13 are molded in the bottom of each cup 12 to prevent the collection of condensation on the bottom of the tumbels placed in the cups. The condensation will flow from the tumblers into the areas between the ribs 13. Preferably the underside of the tray has an integral, continuous, downwardly extending leg 14. A hollow post 15 is integral with the center of the lower tray and extends upwardly from the tray. The upper end of post 15 has an internal integral thread 16. This thread 16 extends substantially once around the entire internal diameter of the post 15 as shown in FIGURE 5. The ends of the thread 16 are offset stepwise relative to each other to establish the pitch of the thread.

The upper tray includes a bottom wall 18 having an upstanding peripheral rim 19 and a central opening 20. A cylindrical flange 21 is integral with the underside of the wall 18, concentric with opening 20, but of greater diameter than the opening. The opening 20 aligns with the central opening in the post 15 and permits insertion of a connecting means to be described hereinafter. A handle 22, including a body portion 23 and an integral handle 24, has a threaded shank 25 affixed to its lower end. The threads on shank 25 mesh with the thread 16 on the inside of the post 15. The shank 25 is inserted through the opening 20 and tightly threaded down by engagement with the thread 16. The shank 25 has an outwardly extending flange which engages the upper surface of wall 18 and a boss 26 which is positioned in the opening 20 to properly position and maintain the upper tray tightly in engagement with post 15.

Figure 4:
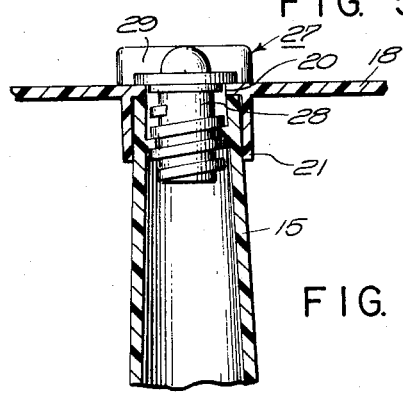
FIGURE 4 is a view similar to FIGURE 3 showing a modified connecting means.

A modified form of my connecting means is shown in FIGURE 4 and includes a plug 27 having a threaded shank 28 substantially similar to the shank 25 on handle 22. The threads on shank 28 engage the thread 16 on the internal wall of the post 15 to maintain the upper tray in tight engagement with post 15. The top of the plug 27 includes finger grips 29 for positioning and turning the plug in the opening 20 of the wall 18 and thread 16 of post 15.

My carrier tray is used by placing tumblers of liquid in the cups 12 and hors d'oeuvres on the upper tray 18, then grasping the handle 24 and carrying the tray to its place of desired use.

My carrier tray is also used by substituting the plug 27 for handle 22 and carrying the tray by supporting it beneath lower tray 10 or grasping the post 15 immediately below the tray 18.

Figure 7:
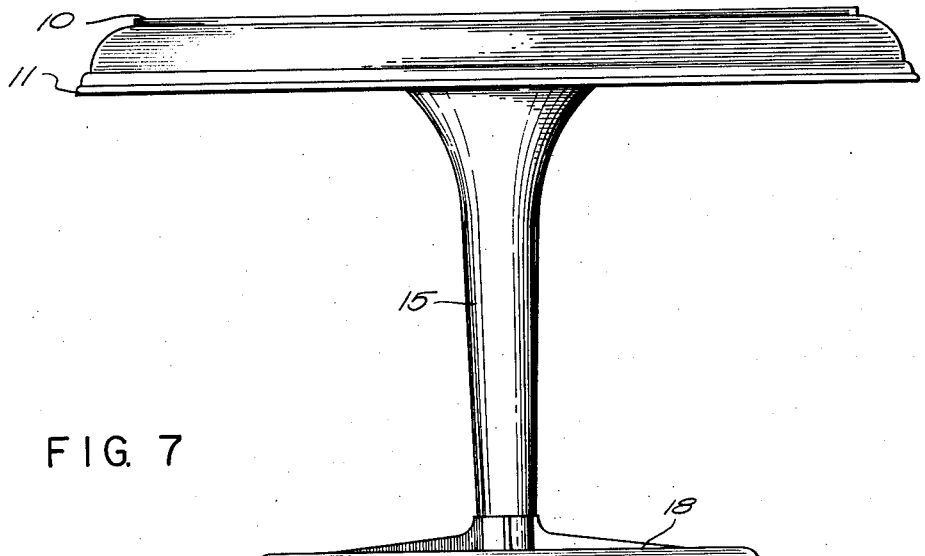
FIGURE 7 shows my invention used as a cake server.
Figure 6:
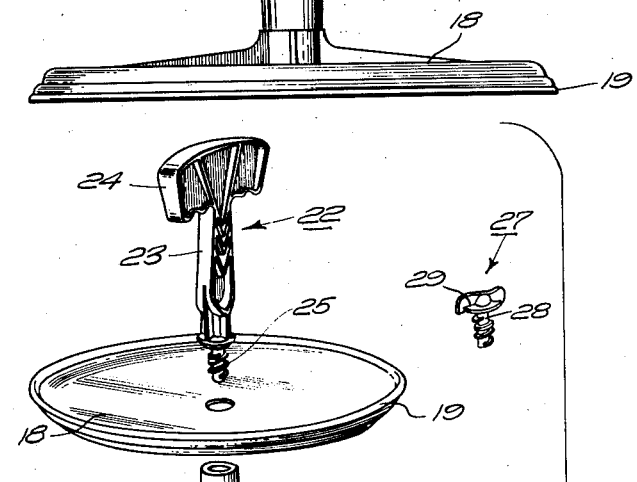
FIGURE 6 is an exploded perspective of my invention.
Figure 6:
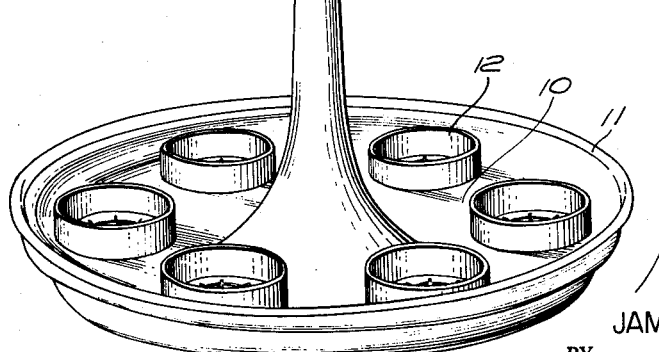

In FIGURE 7, I show my carrier tray used as a cake server. In this construction the plug 28 is used in place of the handle 22 for connecting the tray 18 to the upper end of the post 15, and then the entire carrier tray is inverted as shown in FIGURE 7 for placement of a cake on the top of the wall 10.

While I have shown a present preferred embodiment of my invention it may be otherwise embodied within the scope of the following claims.

I claim:

1. A beverage tray and server comprising a lower substantially flat tray having an upstanding peripheral rim; a plurality of short hollow cylinders fixed to the top side of the tray in equally spaced positions from each other, the axis of rotation of the cylinders being normal to the flat surface of the tray; said cylinders being adapted to contain beverage tumblers; an upstanding post affixed to the center of the tray, the top end of the post containing a vertically extending cylindrical, threaded hollow portion; a removable substantially flat top tray having an upstanding peripheral rim, said tray being a server for appetizers and the like, a central opening in said top tray, a flange on the underside of said top tray defining a ledge portion on said tray positioned inwardly of said flange, said ledge portion engageable with the top end of said post for positioning said top tray in fixed relationship with said bottom tray and said flange engageable with the side walls of said post with the opening in the top tray in vertical alignment with said hollow portion in the post; a threaded member positioned in the opening in the top tray and threadably engaged with the threaded hollow portion of said post, and an enlarged head on said threaded member engaged with the flat surface of said top tray to maintain the tray immovable relative to said post.

2. A beverage tray and server according to claim 1 including an upstanding handle affixed to said enlarged head of the threaded member.

3. A beverage tray and server according to claim 1 wherein the thread in said hollow portion of the post consists of a single inwardly projecting ridge extending substantially only once around the internal diameter of the hollow portion with the ends of the ridge offset stepwise relative to each other to establish the pitch of the thread.

References Cited in the file of this patent
UNITED STATES PATENTS

| | | |
|---|---|---|
| 1,109,496 | Woodburg | Sept. 1, 1914 |
| 1,698,489 | Bickford | Jan. 8, 1929 |
| 2,360,616 | Olsen | Oct. 17, 1944 |